Oct. 12, 1954

C. K. GAERTNER ET AL 2,691,226

COORDINATE POSITION INDICATOR
FOR SIMULATING MOVING TARGETS

Filed July 31, 1953

INVENTORS
CHARLES K. GAERTNER
MERRILL A. FURBUSH
BY
H. A. Mosher
ATTORNEY

Oct. 12, 1954

C. K. GAERTNER ET AL
COORDINATE POSITION INDICATOR
FOR SIMULATING MOVING TARGETS 2,691,226

Filed July 31, 1953

INVENTORS
CHARLES K. GAERTNER
BY MERRILL A. FURBUSH

ATTORNEY

Patented Oct. 12, 1954

2,691,226

UNITED STATES PATENT OFFICE 2,691,226

COORDINATE POSITION INDICATOR FOR SIMULATING MOVING TARGETS

Charles K. Gaertner, Van Nuys, Calif., and Merrill A. Furbush, Mamaroneck, N. Y., assignors to General Precision Laboratory Incorporated, a corporation of New York Application July 31, 1953, Serial No. 371,495

9 Claims. (Cl. 35—10.4)

1

This invention relates to apparatus for simulating moving target maneuvers and for indicating the instantaneous position of the simulated target in terms of orthogonal coordinates such as the usual "X" and "Y" coordinates. The primary object of the invention is to provide an improved device of the character described which will be accurate and easy to manipulate.

Another object of invention is to provide a simulated moving target indicator which will be inexpensive, very simple, will require a minimum of space and will be light in weight.

Another object is to provide improved apparatus of the type described which is capable of integrating the path of the simulated maneuver.

A further object is to provide an improved and inexpensive means for accurately simulating the speed and turn rate. Other and further objects will become readily apparent from the following description when taken in connection with the accompanying drawings in which.

Fundamentally, the preferred embodiment of the invention comprises a driving and driven member in frictional engagement, the rate of movement and direction of the driving member representing respectively, the vector quantities simulating the speed and course of a vehicle while the resultant movement of the driven member simulates the instantaneous rectangular coordinate components of the position of the vehicle. The invention is particularly adapted for use in simulating target maneuvers for radar training devices. The specific improvement of the present invention resides in the simple, novel means for simulating instantaneous course speed and position.

Figure 1:
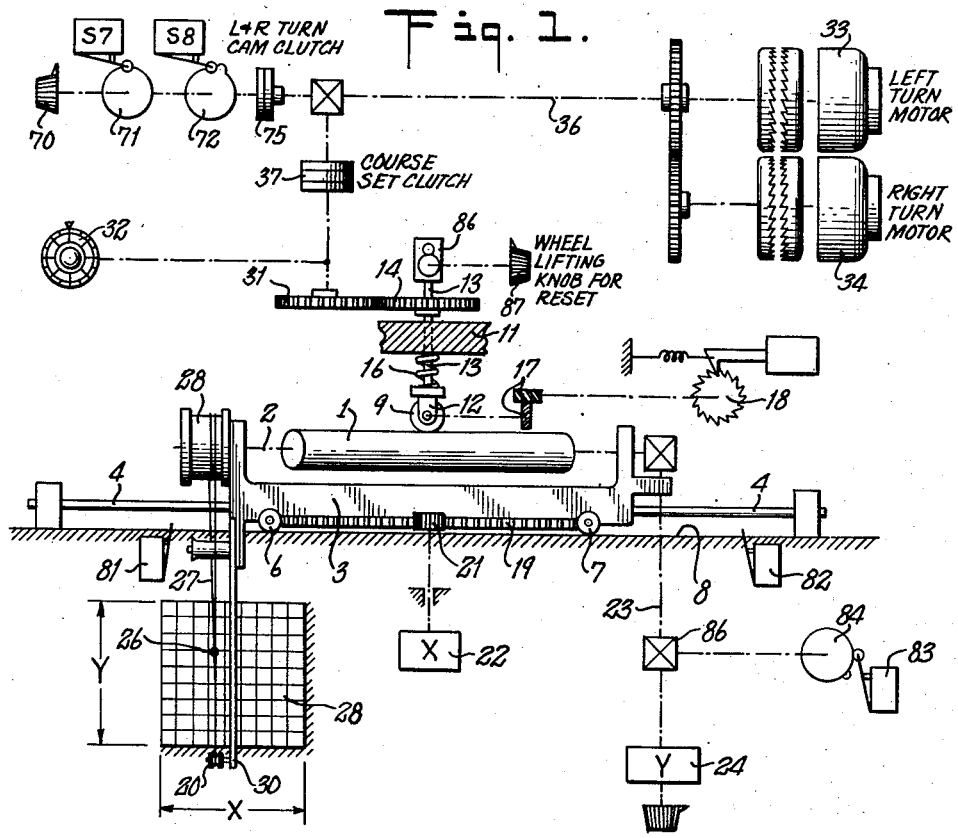
Figure 1 is a mechanical schematic diagram of the preferred embodiment of the invention.

The preferred embodiment of the invention shown in the drawings comprises a hardened cylinder 1 fixed on a shaft 2, which is rotatably journalled in bearings on a suitable movable carriage 3. The carriage 3 in turn is mounted for translatory movement in directions parallel to the shaft 2, by means of rollers 6 and 7 engaging a base 8, the carriage being guided in the translatory movement by guide rods 4 (one of which is shown in Figure 1).

Preferably the cylinder 1 is made of stainless steel and is engaged by a driving wheel 9 also made of very hard material, such as stainless steel, and is rotatably mounted in a fork 12 attached to a vertical shaft 13 journalled in the bracket 11. The bracket 11 is fixed to the main frame (not shown) of which the base 8 is a part. The azimuth position of the plane of rotation of the driving wheel 9 simulates the course angle of the vehicle and may be varied by rotation of the shaft 13 about a vertical axis and this may be accomplished through a gear 14 which may be operated manually or automatically in the manner hereinafter described.

The driving wheel 9 is held in frictional driving engagement with the cylinder 1 by means of a compression spring 16 interposed between the lower surface of bracket 11 and a collar on the shaft 13 above the fork 12. The wheel 9 is driven through a mechanical connection and suitable reduction gearing 17 by a ratchet motor 18. Preferably the ratchet motor 18 and the driving connection to the driving wheel 9 including the gearing 17 is mounted on the fork 12. The plane of rotation of the driving wheel 9 relative to the axis of the cylinder 1 determines the simulated setting of the target course and the azimuthal position of the plane is indicated on the dial 32. Thus, when the axes of the driving wheel 9 and that of the cylinder 1 are at right angles to each other in the position shown in Fig. 1 the simulated target course will be represented by translatory movement only of the cylinder 1. This translatory movement is indicated by longitudinal movement of the carriage 3 along the guide rods 4. A suitable rack 19 mounted on carriage 3 is engaged by a pinion 21 which produces rotational movement corresponding to the translatory movement and this rotational movement is applied to a potentiometer 22. The rotational movement represents the "X" coordinate. Although not illustrated in the drawings the potentiometer is provided for supplying X-coordinate information to a conventional radar scope. When both the axes of the cylinder 1 and the driving wheel 9 are parallel only rotational movement will be transmitted to the cylinder 1 and this rotational movement representing the "Y" coordinate is transmitted to the potentiometer 24 by means of a suitable mechanical connection 23. The potentiometer 24 is provided for supplying Y-coordinate information to the radar scope (not shown). It will be readily apparent that for all intermediate positions of the plane of rotation of the driving wheel 9, that is, intermediate course angles, there will be a combination of translatory and rotational movement of the cylinder 1 representing the instantaneous position of the simulated target in terms of X and Y coordinates and the total movement at any one instant will represent the integrated distance of travel.

The Y-coordinate of the relative position of the simulated target is represented mechanically by an indicator bead 26 on a cable 27 running over a drum 28 which rotates with the shaft 2 and the cylinder 1. The cable 27 engages a sheave 29 rotatably mounted on the lower end of an arm 30 carried by the carriage 3 so that an open reach of the cable lies over a coordinate chart 28. Rotation of the cylinder 1 and the drum 28 moves the indicator bead 26 in the Y-coordinate direction while translatory movement of the carriage 3 moves the indicator bead 26 in the "X" coordinate direction. The range of the movement of the indicator bead 26 is such as to be within the confines of the orthogonal coordinate chart 28, fixed with respect to the base 8 on which the carriage 3 moves.

A target maneuver can be simulated by manually or automatically adjusting the plane of rotation of the driving wheel 9 while the latter is driven by the motor 18 at some preselected speed. The simulated target movement may be varied right or left through any selected azimuth angle and the turning rate will be determined by the relative amount of movement to the right or left with respect to the simulated speed which is represented by the speed of the motor 18. In other words, the ratio of the speeds of the left or right turn motors 33 and 34, respectively, to the speed of the motor 18 determines the turn rate.

To this end, the gear 14 through which the position of the plane of rotation of the driving wheel 9 is controlled, is engaged by a suitable gear 31 which in turn may be rotated manually by the course set dial 32 or by the left turn or the right turn motors 33, 34, respectively, through a suitable mechanical connection 36 and a yieldable drive slip clutch 37. In order to permit the manual setting of the course without turning the motors 33, 34, the slipping clutch 37 is interposed between the dial 32 and mechanical connection 36. Preferably the motors 33 and 34 are of the impulse ratchet type shown and described in U. S. patent to Leland 2,396,880, dated February 7, 1950, and accordingly their speed may be readily varied in proportion to the frequency of the D.-C. pulses supplied to them.

The motor 18, the speed of rotation of which represents the speed of the simulated target is also of the ratchet type and is adapted to be operated by pulsed direct current so that its speed can be readily controlled in coordination with the speed of the right and left turn motors 33 and 34. The novel means for varying the rate of rotation of these pulse motors should be clear from the circuit diagram shown in Fig. 2.

Figure 3:
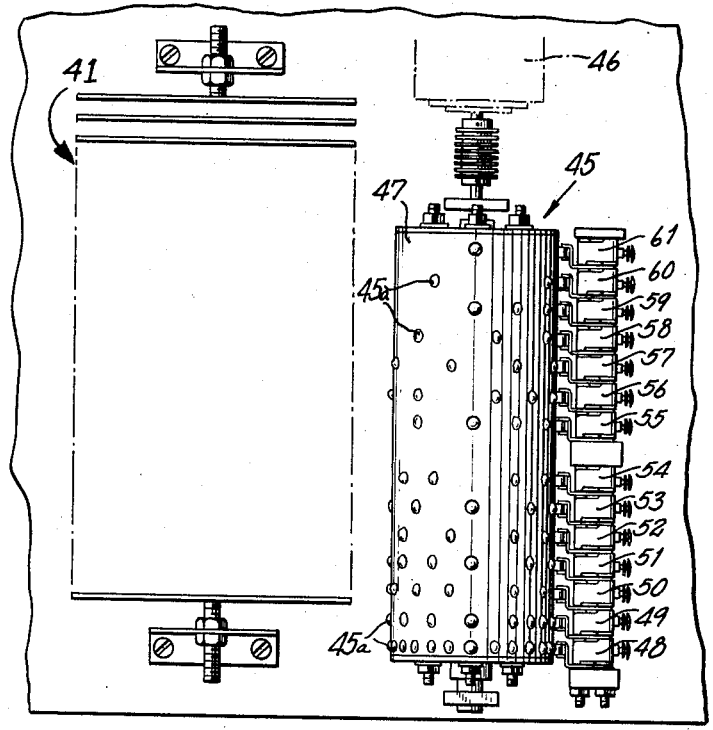
Figure 3 is a plan view of the rectifier and pulsing unit which includes the several circuit make and break devices.
Figure 4:
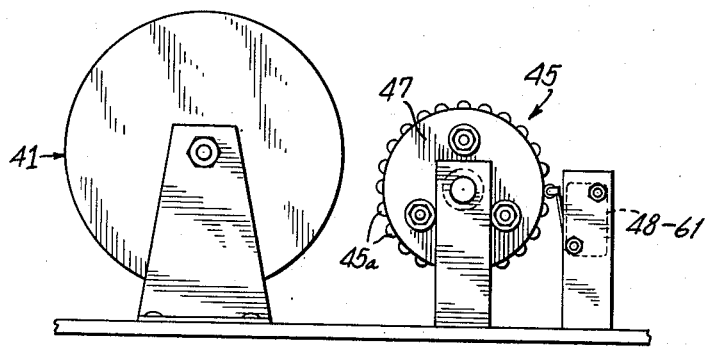
Figure 4 is a profile view of Fig. 3.

A suitable source of alternating current represented by the leads 40 is rectified by a rectifier, such as the bridge rectifier 41, to supply a direct current output between the terminals 42 and 43. The A.-C. source 40 is also used to energize a slow speed motor 46 which drives the pulse unit mechanism 45 comprising a plurality of circuit make and break devices 48—61. The pulse unit mechanism includes a drum 47 (see Figs. 3 and 4) provided with a plurality of circumferential rows of uniformly spaced pins 45a, the number of pins in each row representing the corresponding rates of pulses which are to be generated in their respective associated circuits. When the drum 47 is rotated each circumferential row of pins is adapted to actuate one of the corresponding make and break devices 48—61 and the number of times the switches are opened and closed per revolution of the cylinder 47 will depend on the number of pins in the respective rows. In the specific embodiment illustrated the lower numbered rows are used to generate pulses for the left and right turn motors 33, 34 while the rows on the other end of the cylinders are used to generate the pulses for the target speed simulating motor 18. Effectively, the pulse unit 45 provides a plurality of sources of pulsed direct current with the pulse frequencies of the sources having a mutually fixed ratio with respect to each other.

The simulated target speed is varied in 10 separate steps from 60 to 600 by changing the pulse rate at which the solenoid motor 18 is operated. The turn rate of the course is varied in 16 separate steps from one degree to six degrees per second by changing the ratio between the pulse frequencies supplied to the left or right turn motors 33 and 34, respectively, and those supplied to the motor 18. The drum 47 rotates at a constant speed so that the frequency of the pulses supplied at the output sides of the respective circuit makers and breakers 48—61 is constant but the pulse rate supplied to the motors is selected by the multiple selector switches 74 and 76 by means of which the different make and break devices are selectively included in the respective motor circuits. The simulation of maneuvers can be accomplished by appropriate manual manipulation of the selector switches 74 and 76 to control the ratio of the speeds of the motors 33, 34 and 18. Also, the course may be varied automatically as hereinafter described.

To this end a single pole, triple throw orbit switch 80 is provided in the circuit of the left and right turn motors 33, 34 so that the latter motors may be selectively energized manually or may be controlled automatically. After the selector switch 74 is adjusted to select the frequency to give the desired speed to the turn motors 33, 34, the orbit switch 80 may be manipulated to energize either motor 33 or 34 selectively to simulate the desired turn, it being understood that the ratio of the speed selected for the turn motor to the speed selected for the speed motor 18 determines the rate of turn. When the orbit switch 80 is in the middle position neither turn motor 33 or 34 can be energized unless the automatic turn control switches S7 and S8 are closed as hereinafter described.

The switches S7 and S8, which are termed micro switches, are of conventional commercial construction and the ones utilized in one embodiment of this invention were Type V3 Micro Switches made by the Micro Switch Company, which company is a division of the Minneapolis Honeywell Regulator Company. The construction of this switch and the manner of operation is described in Catalog No. 72 of the Micro Switch Company.

Figure 6:
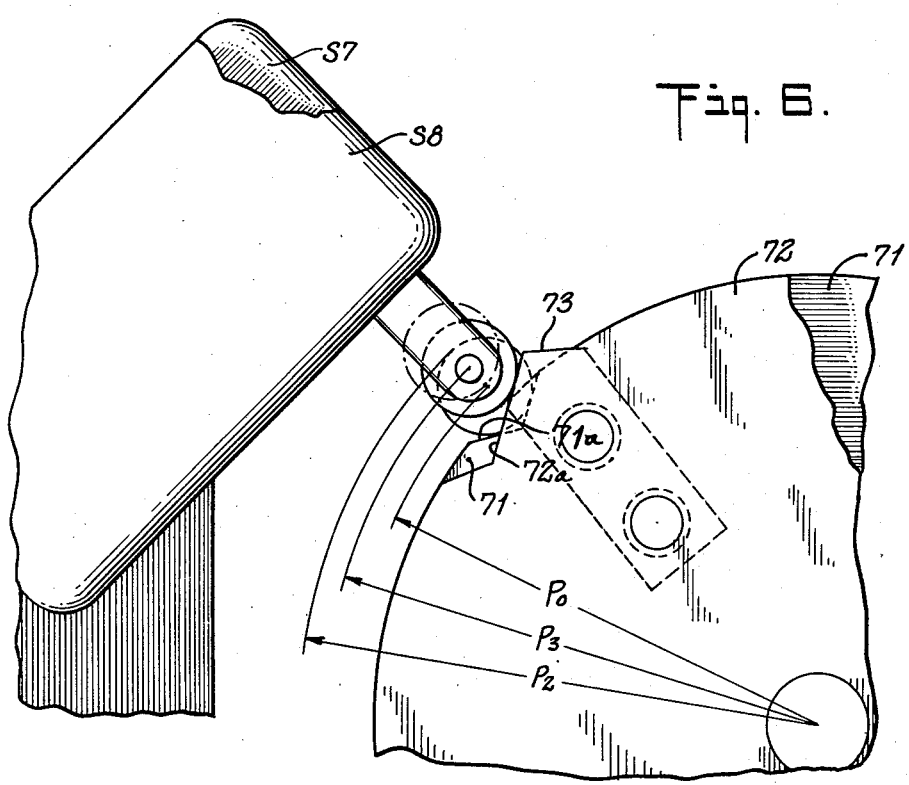
Figure 6 is a partial profile view of Figure 5 showing the relative position or phase relation between the cams for operating the direction-responsive switches.

The switch S7 is a single pole single throw switch which serves as a turn limit switch when either a right or left course is selected. The switch S8 is a single pole double throw switch and because of the special control by the direction cam 72 automatically selects the left or right turn motors in accordance with the direction in which the cams 71 and 72 are manually adjusted from their zero position indicated in Figures 2 and 6. With this arrangement a left or right course may be selected from zero to approximately 350° in either direction. After the simulated course has been effected through the selected azimuth angle of the maneuver the switch S7 opens the turn motor energizing circuit and the speed motor 18 continues to operate to simulate a straight line course until the limit of the target area has been reached. A yielding drive friction clutch 75 (see Fig. 1) permits the adjustment of the cams 71, 72, by manual control knob 70 without operating the turn motors 33, 34 and without changing the setting of the driving wheel 9. As an example, assuming that it is desired to set a left turn through an azimuth angle of 45°, the knob 70 is turned so that the cams 71 and 72 are turned in a counterclockwise direction from their zero positions to the 45° position. Then when the left turn motor 33 operates to execute the left turn the cams 71, 72 will be rotated in a clockwise direction back to their original position and they will stop when the switch S7 opens, thus deenergizing the turn motor. The driving force through the yielding slip clutch 75 is sufficient to rotate the cams 71, 72 back to their normal position but is not sufficient to turn the motors 33, 34 or the integrating mechanisms from the control knob 70.

Figure 5:
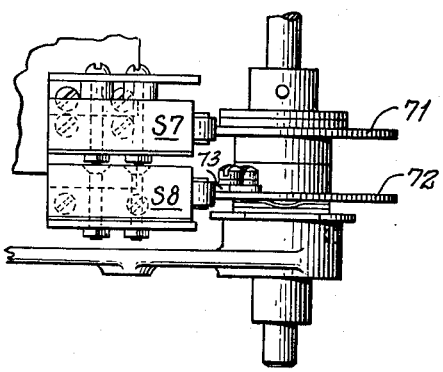
Figure 5 is an enlarged detailed view of the direction-responsive microswitches for determining the course setting.

The operating mechanisms of the switches S7 and S8 are identical except, as mentioned above, the switch S7 is of the single throw type while switch S8 is of the double throw type. It will be seen from Figures 5 and 6 that the switches are arranged side by side, each being mounted at a definite position relative to the axis of rotation of the cams so that the different dimensions on the cams appropriately operate the switches in accordance with the principles illustrated in Figure 7. As will be clear from Figure 7 the switches S7 and S8 have a characteristic such that when they are operated from the free position to a closed position in one direction the opening or release position will be between the free position and the closing position. In other words there is a differential movement of their operating mechanism which lends them to the novel control system disclosed herein.

Referring to Figure 2 again, it should be clear that each of the switch units is provided with an appropriate operating arm with a cam roller mounted at the outer end to engage an operating cam. Obviously, the roller is not absolutely essential to the operation since any other suitable plunger could operate the switch in the same manner although its operating life might be shorter. The two cams 71, 72 are quite similar, being circular discs with identical notches 71a and 72a to accommodate the movement of the switch arms to the free position, the circular edge surface serving to hold the switches in another position. In addition, the cam 72 is provided with a triangular pointed cam element 73 which is secured to the cam disc by suitable screws. The triangular point of the cam element 73 projects beyond the circular edge surface of cam 72 and is so adjusted that one of its triangular edges is collinear with one of the sides of the notch 72a so that it forms an extension thereof beyond the circular edge of the cam disc 72. It will be noted from Figure 6 that the notches in the respective cam discs 71 and 72 are so phased that the operating roller for the switch S8 has reached a point where the bottom of the roller is just even with the circular edge surface of the disc 72 at the same time that the operating roller for switch S7 is engaging the bottom of the notch in the disc 71. When the operating roller of the switch S7 engages the notch 71a of the cam 71 the switch S7 will be open. From Figure 7 it will be clear that when the switches are operated from the position $P_0$ to any point beyond $P_1$, the operating position, the switches will be operated to their other respective positions. In the case of switch S7 this is the open position and for switch S8 lower contacts will be closed. The position $P_2$ merely represents the maximum limit of travel and any movement between the positions $P_1$ and $P_2$ are ineffective.

Although the cam discs 71 and 72 are of the same diameter, it will be noted that the switches S7 and S8 are so positioned relative to the cams that the switch S7 is in a position between $P_3$ and $P_0$ and therefore its contacts are open, but switch S8 is between $P_2$ and $P_1$ which permits the lower contacts of switch S8 to remain closed. The open position of switch S7 corresponds to the position of switch S8 when the latter's upper contacts are closed.

Figure 7:
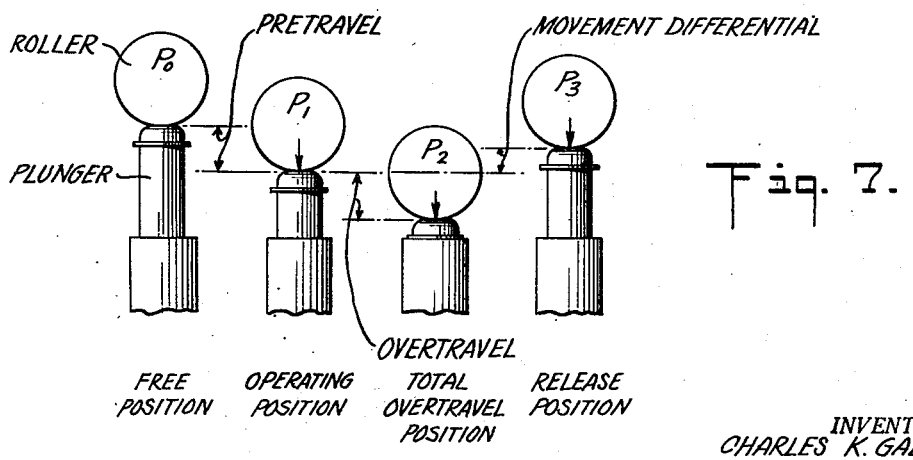
Figure 7 is a schematic illustration of the operation of the direction-responsive switches.

It will be clear from Figure 7 that so long as the operating roller for the switch S8 is not returned toward its free position from as far as the position $P_3$ from any position beyond $P_1$ the switch S8 will remain closed in the lower position. However, if the cam disc 72 is turned further in a counterclockwise direction so that the triangular cam element 73 moves the roller for the switch S8 beyond the position $P_3$ the switch S8 will close in the upper position, Figure 2, and will not return to the lower closed position until the roller has again engaged the notch 72a so that the roller moves to position $P_1$.

Figure 2:
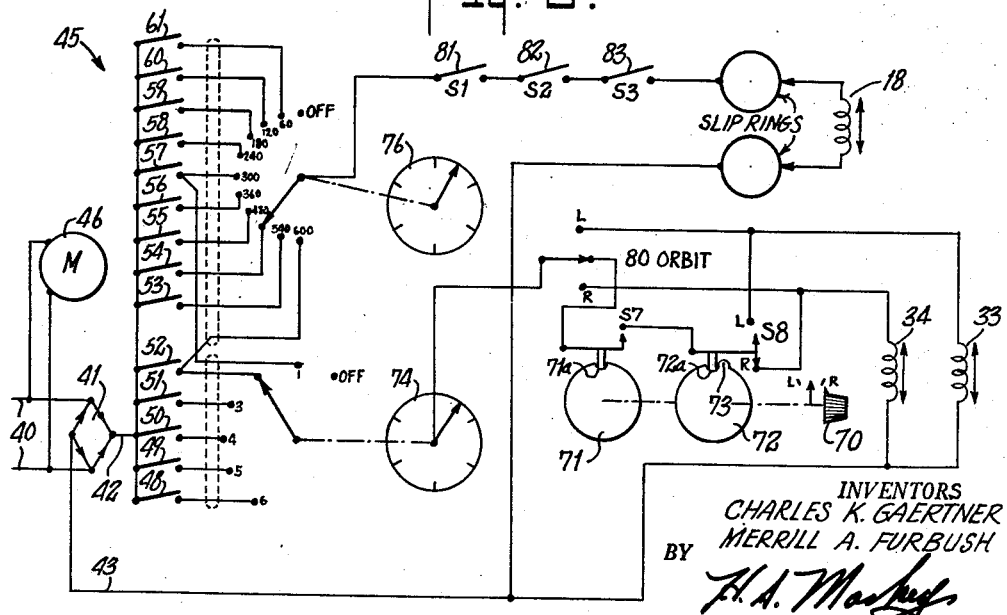
Figure 2 is an electrical schematic circuit diagram of the invention.

When the cams 71 and 72 are in the position shown in Figure 2 and neither of the turn motors 33 or 34 can be energized because the single pole contacts of switch S7 are open. At this same time the lower contacts of the switch S8 are closed. Under these conditions, assuming that the orbit switch 80 is in the intermediate position the target can be made to simulate a left turn by turning the control knob 70 to the left by an amount corresponding to the azimuth angle to which it is desired to simulate the maneuver. This connection causes the cam 71 to move the switch S7 from the $P_0$ position to the operating position $P_1$ or beyond to close its contacts at the same time that the cam element 73 on the cam disc 72 causes the switch S8 to be moved to the position $P_1$ or beyond toward position $P_3$ to thereby cause the lower contacts to be open and the upper contacts to be closed. It will be noted that for any positions on the cams where the rollers engage the circular edge surfaces of the latter these switches will remain in these respective positions. This will cause the left turn motor 33 to be energized and, through the yielding drive clutch 75 the cams 71 and 72 will be rotated in a clockwise direction toward the zero position. As soon as the operating roller mechanism of switch S7 engages the bottom of the notch 71a of the cam disc 71 the contacts are opened causing the left turn motor 33 to be deenergized. Now, assuming that it is desired to simulate a right turn, the knob 70 will be turned to rotate the cams 71 and 72 in a clockwise direction to the extent it is desired the turn to be made. Here again as soon as the operating roller for the switch S7 rides out of the notch 71a the contacts of S7 will be closed. Since the mechanism of the switch S8 is so adjusted that when its roller rides on the outer circular edge of the cam without being engaged by the cam element 73 the switch is not moved as far as the position P1 and the lower contacts of switch S8 remain closed. This completes the circuit through the right turn motor 34 causing the latter to rotate the cams 71 and 72 in a counterclockwise direction to return them to free position where the contacts of switch S7 again open to deenergize the motor circuit.

In the operation of the device a target maneuver may be simulated by manual adjustment of dial 32 to fix the position of the plane of rotation of the driving wheel 9 and adjustment of selector switch 76 to choose the simulated vehicle speed. The integrated course in terms of "X" and "Y" coordinates is indicated by the instantaneous position of the bead 26 relative to the rectilinear chart 28. The "X" and "Y" potentiometers 22 and 24, respectively, supply the same position information to a radar scope (not shown).

The course may be varied manually by adjusting the selector switch 74 to select the desired speed in the turn motors 33, 34. The direction of turn is determined by the left and right turn positions "L" and "R" of the orbit switch 80.

Since the rotation of the motor 18 effects movement of the integrator along both "X" and "Y" coordinates, depending upon the orientation of the driving wheel 9, suitable limit switches such as 81 and 82, at the opposite ends of the guide rods 4 are arranged to be opened when the carriage 3 arrives at the extreme ends of its movement. Also, a limit switch 83 is provided, which is adapted to be actuated by a "Y" travel limit cam 84 driven by the cylinder 1 through gearing 86 from the mechanical connection which drives the "Y" potentiometer 24. All of these limit switches 81, 82 and 83 are connected in series in the circuit through the motor 18 in order to limit the movement of the integrator to the range for which the apparatus is designed.

From Figure 2 it should be clear that the actual maneuver executed by the simulating mechanism depends upon the preselected target speed and turn rate established by the controls mentioned above. After the target has travelled through the selected azimuth angle of the maneuver, it will continue in a straight line until the limit of the target area has been reached; that is, until one of the limit switches opens the circuit controlling the motor 18.

In order to move or reset the integrating cylinder 1, it is necessary to raise the driving wheel 9 out of engagement with this cylinder. This may be accomplished by any suitable mechanism 86 which may be operated by the manually operated knob 87.

From the foregoing description it will be readily apparent that the present invention provides an improved target course and speed simulating device which is very inexpensive and simple. One of the salient features of the invention is the novel means for providing a plurality of sources of pulsed direct current, the respective frequencies of which are different so that the relative speeds of the different motors can be readily controlled by selectively applying the different sources in such a manner that the speeds of the respective motors will bear definite ratios to each other. Another important feature is the simple arrangement for automatically and selectively controlling the direction, rate and limit of turning azimuth of the maneuvers.

Although only one embodiment of invention is shown it is readily apparent that many modifications may be made without departing from the scope of invention as defined in the attached claims.

What is claimed is:

1. A device for simulating target maneuvers comprising a driving member whose speed of operation represents target speed and whose position represents instantaneous course, a driven member actuated by said driving member and mounted for movement in directions representing orthogonal components whose instantaneous values represent simulated instantaneous position of the target and whose rate of change of values represent the rate of change of speed of said target, means for operating said driving member, means for varying the direction of application of force of said driving member on said driven member, said means for operating said driving member and said means for varying the direction of application of force of said driving member comprising pulse-responsive motors, the speeds of which are proportional to the respective pulse frequencies supplied to the motors and the relative speeds of which motors determine the simulated turn rate, a source of direct current, a plurality of parallel electrical paths adapted to be interposed between said source of direct current and said pulse-responsive motors, said paths including circuit making and breaking devices, means for operating said latter devices at different rates, and means for selectively including one of said paths in respective circuits including said direct current source and said motors.

2. A device for simulating moving target maneuvers comprising a rotating driving member, a member frictionally engaged by said rotating member and mounted for movement in directions representing rectangular coordinates, means for dirigibly mounting said rotating driving member so that it may be pivotally adjusted about an axis intersecting the axis of rotation of said rotating driving member to thereby change the orientation of the plane of rotation of said driving member, means for rotating said driving member at a rate representing the simulated speed of a target, means for changing the plane of rotation of said driving member to vary the direction of the application of force to said driven member, means for varying the rate of rotation of said driving member to represent simulated speed changes of the target, said means for rotating said driving member and for changing the plane of rotation of said driving member comprising pulse-responsive motors, the speeds of which are proportional to the respective pulse frequencies supplied thereto, a source of direct current, means for providing a plurality of electrical paths having means for opening and closing the respective paths at different frequencies, and means for selectively including said electrical paths in circuits including said direct current source and said motors, the relative frequencies in the respective established electrical energizing circuits determining the speed and turn rate of the simulated target maneuver.

3. A moving target course simulator and integrator comprising a driving member whose speed represents simulated target speed and whose axis of rotation is a function of the instantaneous course, a driven member actuated by said driving member and mounted for movement in directions representing orthogonal components whose instantaneous values represent instantaneous positions of said target and whose rate of change of values represent rate of change of turn, means for rotating said driving member, means for varying the direction of application of force of said driving member on said driven member, both of said latter means comprising pulse-responsive motors, the respective speeds of which are proportional to respective pulse frequencies supplied thereto, means for selectively supplying pulses at different frequencies in order to vary the speeds of rotation of the respective motors, said latter means comprising the source of direct current, a cylindrical member having a plurality of circumferential rows of equally spaced protruding elements with the number of elements in each row differing from each other, a circuit make and break device operatively associated with each of the respective rows and adapted to be operated thereby and means for selectively completing circuits through said motors including said direct current source and one of said make and break devices.

4. A device for simulating target maneuvers, comprising a driving member whose speed represents target speed and whose plane of rotation represents instantaneous course, a driven member actuated by said driving member and mounted for movement in directions representing orthogonal components, means for varying the speed of operation of said driving member in stepped variations comprising, a pulse-responsive motor, means for providing a source of D.-C. pulses at different frequencies from a source of direct current, said latter means including a cylindrical member adapted to be rotated at a selected speed, said cylindrical member having a plurality of circumferential rows of equally spaced surface variations with each row having the number of variations differing from each other circuit, make and break devices operatively associated respectively with each of said rows, and means for selectively establishing an energizing circuit including said direct current source, said pulse-responsive motor and one of said circuit make and break devices.

5. A device for simulating target maneuvers comprising a rotatable driving member, said driving member being mounted for pivotal movement about an axis intersecting the axis of rotation, a cylindrical member frictionally engaged by said driving member and adapted to be rotated by the latter, said cylindrical member being mounted for rotational movement and translatory movement parallel to the axis of rotation whereby the translatory movement thereof represents the "X" coordinate and the rotational movement thereof represents the "Y" coordinate, pulse-responsive means for rotating said driving member at speeds simulating the speed of the target, means for supplying electrical pulses to said motor at variable rates for varying the speed of the latter said latter means comprising a source of direct current, a plurality of electrical paths including respective circuit makers and breakers, means associated with each circuit maker and breaker for operating the latter at different rates, and means for selectively and sequentially interposing one of said electrical paths in a circuit including said direct current source and said pulse-responsive means.

6. A device for simulating target maneuvers comprising a driving member whose speed represents target speed and whose plane of rotation represents instantaneous course, a driven member frictionally engaged and actuated by said driving member and mounted for movement in directions representing orthogonal components, means for varying the speed of operation and another of said motors, adapted to change tion of said driving member, means for changing the position of the plane of rotation of said driving member in a selected manner coordinated with the simulated speed of the target in order to simulate various turn rates, said means for varying the speed and position of the plane of rotation of said driving member including pulse-responsive motors the speeds of which are proportional to the frequencies of the respective pulses supplied thereto, means for selectively applying to said motor pulses the respective frequencies of which are proportional to the speeds of operation desired, one of said motors adapted to change the plane of rotation of said driving member in one direction simulating a left turn and another of said motors adatped to change the plane of rotation of said driving member in the opposite direction simulating a right turn, means for selectively energizing either left or right turn motors and for preselecting the limit of the angle of turn comprising, a single pole single throw switch and a single pole double throw switch connected in series and adapted to be selectively connected in either of said turn motor circuits, mechanical actuating means for simultaneously controlling both of said switches, the first of said switches serving as a limit switch and the other as a direction selecting switch by alternately including either the left or right turn motor in an energizing circuit, said mechanical means including operating cams, the first of which has a recess which permits the opening of said first switch and determines the limit of operation of said turn motors, the second of which has a recess for permitting the closure of said single pole double throw switch in one direction and a projecting surface for moving said latter switch to its other closing position, and a yielding driving connection between said turn motors and said cams to permit adjustment of said cams without operating said turn motors, but capable of driving said cams from an angle limit turn position to the normal position.

7. A device for simulating moving target maneuvers comprising a rotating driving member, whose speed represents target speed and whose plane of rotation represents instantaneous course, a driven member frictionally engaged and actuated by said driving member and mounted for rotational movement and translatory movement representing orthogonal components of the instantaneous position of a target, means for dirigibly mounting said driving member so that it may be pivotally adjusted about an axis intersecting the axis of rotation of said driving member to thereby change the orientation of the plane of rotation of said driving member, means for rotating said driving member at variable speeds and separate means for changing the position of the plane of rotation of said driving member in a coordinated selected manner in order to simulate various turn rates, said means for rotating said driving member and said means for varying the position of the plane of rotation of said driving member including pulse-responsive motors, the speeds of which are proportional to the frequencies of the respective pulses supplied to the respective motors, means for making available from a single source of direct current a plurality of sources of pulsed direct current of different fixed pulse frequencies, means for selectively applying to said speed motor pulses from one of said sources having a frequency which is proportional to the speed of operation desired, means for selecting one of said sources of a frequency the relation of which to the frequency of the other selected source will represent the desired turn rate and means for selectively applying the energy from said last mentioned source to either of said turn motors.

8. A device for simulating moving target maneuvers comprising a rotating driving member whose speed represents target speed and whose plane of rotation represents instantaneous course, a driven member frictionally engaged and actuated by said driving member and mounted for rotational movement and translatory movement representing orthogonal components of the instantaneous position of a target, means for dirigibly mounting said driving member so that it may be pivotally adjusted about an axis intersecting the axis of rotation of said driving member to thereby change the orientation of the plane of rotation of said driving member, means for rotating said driving member at variable speeds and separate means for changing the position of the plane of rotation of said driving member in a coordinated selected manner in order to simulate various turn rates, said means for rotating said driving member and said means for varying the position of the plane of rotation of said driving member including separate pulse-responsive motors, the speeds of which are proportional to the frequencies of the pulses supplied to the respective motors, means for making available from a single source of direct current a plurality of sources of pulsed direct current of different fixed pulse frequencies, means for selectively applying to said motor rotating said driving member pulses from one of said sources having a frequency which is proportional to the speed of operation desired, means for selecting one of said sources of a frequency the relation of which to the frequency of the other selected source for operating said driving member motor will represent the desired turn rate, means for selectively applying the energy from said last mentioned source to either of said turn motors, means for selecting the direction and turn limit angle comprising two switches in series and adapted to be selectively connected in either of said turn motor circuits, said switches having a free or normal position, an operating position in one direction and a release or return position in the opposite direction between said free position and said operating position, the first of said switches being a single pole, single throw switch and the second of said switches having double throw contacts for selectively energizing one of said turn motors when moved to operating position or beyond and to energize the other of said motors when moved to the release position or further in the direction of said free position, means for controlling said latter two switches including two cams, one having a notch for permitting said first switch to remain in the free position and thus determine the limit of operation of said turn motors, the second of which has a recess for permitting the closure of said second switch in one direction to energize one turn motor and a projecting surface for moving said latter switch to its other closing position to energize the other of said turn motors, and a yielding driving connection between said turn motors and said cams to permit adjustment of said cams without operating said turn motors but capable of driving said cams from a set angle limit turn position to the normal position.

9. A device for simulating moving target maneuvers comprising a rotating driving member whose speed represents target speed and whose plane of rotation represents instantaneous course, a driven member frictionally engaged and actuated by said driving member and mounted for rotational and translatory movement representing orthogonal components of the instantaneous position of a target, means for dirigibly mounting said driving member so that it may be pivotally adjusted about an axis intersecting the axis of rotation of said driving member and said driven member to thereby change the orientation of the plane of rotation of said driving member and therefore change the direction of application of driving force supplied to the surface of said driving member, means for rotating said driving member at variable speeds and separate means for changing the position of the plane of rotation of said driving member in a coordinated selected manner in order to simulate various turn rates, said means for rotating said driving member and said means for varying the position of the plane of rotation of said driving member including separate pulse-responsive motors, the speeds of which are proportional to the frequencies of the pulses supplied to the respective motors, means for making available from a single source of direct current a plurality of sources of pulsed direct current of different fixed pulse frequencies including a rotatable member having a plurality of circumferential rows of uniformly spaced protruding elements with the number of elements in each row differing from each other by a selected amount corresponding to the different pulse frequencies desired, the individual circumferential rows of protruding elements adapted to engage a circuit make and break device operatively associated with each of the respective rows, means for selectively applying to said motor rotating said driving member pulses from one of said sources having a frequency which is proportional to the speed of operation desired, means for selecting one of said sources of a frequency, the relation of which to the frequency of the other selected source for operating said driving member motor will represent the desired turn rate, means for selectively applying the energy from said last mentioned source to either of said turn motors, means for selecting the direction and turn limit angle comprising two switches in series and adapted to be selectively connected in either of said turn motor circuits, one of said switches serving as an angle limit switch and the other as a turn direction motor selector switch, said switches having a free position, an operating position in one direction and a release or return position in the opposite direction between said free position and said operating position, the first of said switches constituting the angle limit switch being open at all positions between the free position and the release or return position and closed in all positions beyond the operating position in the other direction, the second of said switches being a closing position for separate contacts on either side of said free position for selectively energizing the respective turn motors, means for controlling said latter two switches including a cam for each of the respective switches, the cam for operating said first switch having the major part of its outer edge of circular shape adapted to hold said switch beyond the release position and having a notch to permit the contacts to close in one direction, the second of said cams having the major part of its outer surface of such dimension as to permit said second switch to remain in the closed position in one direction and also having a surface extending beyond said major portion for causing said second switch to be operated beyond its release position to close the contacts in the other direction, a yieldable driving connection between said cams and said turn motors whereby the positions of said cams may be adjusted simultaneously without operating said turn motors although operation of either motor will return said cams to their normal or free position.

References Cited in the file of this patent

UNITED STATES PATENTS

| Number | Name | Date |
|---|---|---|
| 1,682,508 | Harvey | Aug. 28, 1928 |
| 2,457,832 | Poorman | Jan. 4, 1949 |
| 2,485,262 | Decker | Oct. 18, 1949 |
| 2,531,400 | Clarkson, Jr. | Nov. 28, 1950 |
| 2,662,305 | Alric | Dec. 15, 1953 |